(12) United States Patent
Ohki et al.

(10) Patent No.: US 9,353,231 B2
(45) Date of Patent: May 31, 2016

(54) COMPOSITE BASE MATERIAL

(71) Applicant: Teijin Limited, Osaka-shi, Osaka (JP)

(72) Inventors: Takeru Ohki, Matsuyama (JP);
Katsuyuki Hagihara, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 14/412,749

(22) PCT Filed: Jul. 2, 2013

(86) PCT No.: PCT/JP2013/068572
§ 371 (c)(1),
(2) Date: Jan. 5, 2015

(87) PCT Pub. No.: WO2014/007389
PCT Pub. Date: Jan. 9, 2014

(65) Prior Publication Data
US 2015/0152231 A1  Jun. 4, 2015

(30) Foreign Application Priority Data

Jul. 5, 2012 (JP) ................................. 2012-151470

(51) Int. Cl.
*C08J 5/24* (2006.01)
*B29C 70/12* (2006.01)
*C08J 5/04* (2006.01)
*B29C 70/46* (2006.01)

(52) U.S. Cl.
CPC ............... *C08J 5/042* (2013.01); *B29C 70/465* (2013.01); *C08J 5/24* (2013.01); *B29C 70/12* (2013.01); *C08J 2300/22* (2013.01); *C08J 2333/20* (2013.01); *C08J 2367/02* (2013.01); *C08J 2369/00* (2013.01); *C08J 2377/02* (2013.01)

(58) Field of Classification Search
CPC .................................... C08J 5/24; B29C 70/12
USPC ..................... 524/496, 847; 521/50
See application file for complete search history.

(56) References Cited

U.S. PATENT DOCUMENTS

| | | | |
|---|---|---|---|
| 8,829,103 B2 * | 9/2014 | Konagai | ................ C08L 101/00 428/35.7 |
| 2014/0080960 A1 | 3/2014 | Konagai et al. | |
| 2014/0080961 A1 * | 3/2014 | Konagai | ................... C08J 5/042 524/495 |

FOREIGN PATENT DOCUMENTS

| | | |
|---|---|---|
| EP | 1988118 A1 | 11/2008 |
| JP | 2008-068720 A | 3/2008 |
| JP | 2011-178890 A | 9/2011 |
| JP | 2011-178891 A | 9/2011 |
| JP | 2011178890 A * | 9/2011 |
| JP | 2011178891 A * | 9/2011 |
| JP | 2013-049749 A | 3/2013 |
| JP | 2013-049751 A | 3/2013 |

OTHER PUBLICATIONS

Harper, L.T., Turner, T.A., Warrior, N.A., and Rudd, C.D., "Characterisation of random carbon fibre composites from a directed fibre preforming process: The e ffect of tow filamentisation," Composites Part A: Applied Science and Manufacturing, Elsevier Science Publishers B.V., Amsterdam, NL, vol. 38, No. 3, Dec. 15, 2006, pp. 755-770.

* cited by examiner

*Primary Examiner* — Kelechi Egwim
(74) *Attorney, Agent, or Firm* — Banner & Witcoff, Ltd.

(57) ABSTRACT

There is provided a composite base material, including: carbon fibers having an average fiber length of 3 mm or more and 100 mm or less; and a thermoplastic resin is firmly fixed to the carbon fibers in an amount of 3 to 100 parts by mass with respect to 100 parts by mass of the carbon fibers, wherein a void ratio is more than 7 vol % to less than 100 vol %.

12 Claims, 5 Drawing Sheets

COMPOSITE BASE MATERIAL

CROSS REFERENCE TO RELATED APPLICATIONS

This is a U.S. National Phase Application under 35 U.S.C. §371 of International Application No. PCT/JP2013/068572, filed Jul. 2, 2013, and published Under PCT Article 21(2), which claims priority to Japanese Application No. 2012-151470, filed Jul. 5, 2012, the entire contents of each of which are incorporated herein by reference.

TECHNICAL FIELD

The present invention relates to a composite base material that is an intermediate of a carbon fiber-reinforced composite material which includes a thermoplastic resin as a matrix, the carbon fiber-reinforced composite material indicating here a precursor directly used for molding, and provides a composite base material excellent in the handleability and in-plane isotropy and suitable for the production of a carbon fiber-reinforced composite material not including a specific orientation in the in-plane directions and being excellent in the in-plane isotropy and mechanical characteristics.

BACKGROUND ART

In the application where a metal material has been conventionally used, it is an important technical challenge to achieve weight reduction while maintaining the mechanical property and productivity required in the application by using, instead of a metal material, a fiber-reinforced composite material, particularly a fiber-reinforced composite material including a resin and reinforcing fibers such as a carbon fiber, an aramid fiber or a glass fiber.

For enhancing the mechanical property of the fiber-reinforced composite material, a technique of using a continuous fiber or increasing the fiber volume content ratio (VD is known. In the case of using the continuous fiber in the fiber-reinforced composite material, the mechanical property may be enhanced due to increase of Vf. However, a woven fabric, a unidirectional material, and the like, in which a continuous fiber is used, generally have a problem that fibers are stacked at various angles, for example, at 0°/+45°/−45°/90°, because of the anisotropy of the fibers, and furthermore the stacking process becomes complicated, for example, the fibers are stacked in plane symmetry, so as to prevent warpage of the shaped product, which leads to low productivity. On the other hand, in the case of a fiber-reinforced composite material obtained from a mat-form material of cut fibers, it is difficult to enhance the fiber volume content on account of the presence of fibers in the three-dimensional direction or many fiber entanglements, and the like. In addition, when the mat-form material of cut fibers is used as a reinforcing fiber of a fiber-reinforced composite material, there is a problem that the reinforcing fiber is difficult to sufficiently develop strength enhancement due to discontinuity of the fibers compared with the case of using a continuous fiber, and development rate of strength of the reinforcing fiber in a shaped article is 50% or less relative to the theoretical value. For example, Non-Patent Document 1 describes a fiber-reinforced composite material obtained from a carbon fiber mat by using a thermosetting resin as a matrix, but development rate of strength of such a fiber-reinforced composite material is about 44% relative to the theoretical value.

A fiber-reinforced composite material including a thermosetting resin as a matrix, which has been conventionally proposed, is obtained by subjecting an intermediate base material called a prepreg in which a reinforcing fiber base material is previously impregnated with a thermosetting resin to heating and pressurization by the use of an autoclave, for 2 hours or more depending on the case. In recent years, there has been proposed an RTM method where a reinforcing fiber base material not impregnated with a resin is set in a mold and then a thermosetting resin is infused therein, and the molding time has been greatly shortened. However, even when the RTM method is used, molding of one component requires 10 minutes or more (Patent Document 1).

Accordingly, attention has been focused on a composite material including, as a matrix, a thermoplastic resin in place of the conventional thermosetting resin, particularly, on a composite material including a carbon fiber as a reinforcing fiber (carbon fiber-reinforced composite material). However, the thermoplastic resin requires a long time to impregnate a fiber base material with the resin because of high viscosity compared with a thermosetting resin, as a result, the tact time for molding disadvantageously becomes long. In addition, it is known that a carbon fiber-reinforced composite material having an in-plane isotropy, in which carbon fibers are not oriented in a specific direction in the plane, is preferred, but when forming a composite material by impregnating a carbon fiber mat, or the like, with a thermoplastic resin, a high pressure is required for the impregnation due to high viscosity of the thermoplastic resin in a molten state, and there is a problem that it becomes difficult to maintain the in-plane isotropy by generating disorder of fiber orientation attributed to flow of the fibers and resin as in the molding.

CITATION LIST

Patent Document

Patent Document 1: JP-A-2008-68720 (the term "JP-A" as used herein means an "unexamined published Japanese patent application")

Non-Patent Document

Non-Patent Document 1: Composite Part A, 38 (2007), pp. 755-770

SUMMARY OF INVENTION

Problems that Invention is to Solve

An object of the present invention is to provide a composite base material excellent in the handleability and in-plane isotropy and suitable for the production of a carbon fiber-reinforced composite material and not including a specific orientation in the in-plane directions and being excellent in the in-plane isotropy and mechanical characteristics.

Means for Solving Problems

As a result of intensive studies to solve the above-described problems, the present inventors have focused attention on an intermediate at a previous stage of a precursor (fiber-reinforced composite material) which is a molding material directly used for molding and found that a composite base material constituted by a carbon fiber and a thermoplastic resin and having a specific void ratio is suitable as the intermediate of the carbon fiber-reinforced composite material.

The present invention has been accomplished based on this finding. The configurations of the present invention are set forth below.

[1] A composite base material, including: carbon fibers having an average fiber length of 3 mm or more and 100 mm or less; and a thermoplastic resin is firmly fixed to the carbon fibers in an amount of 3 to 1000 parts by mass with respect to 100 parts by mass of the carbon fibers, wherein a void ratio of the composite base material is more than 7 vol % to less than 100 vol %.

[2] The composite base material according to [1], wherein the composite base material is obtained by heating and pressurizing a mat-form material in which a carbon fiber mat and a thermoplastic resin are combined, and the composite base material is obtained by applying heat and pressure so that a decrease in the void ratio does not exceed 40 vol % in one heating and pressurizing treatment.

[3] The composite base material according to [1] or [2], wherein the composite base material is obtained by heating and pressurizing a mat-form material in which a carbon fiber mat and a thermoplastic resin are combined, and the composite base material has the void ratio of more than 7 vol % to less than 80 vol %, obtained by preparing a composite base material having a void ratio of 60 vol % or more and further heating and pressurizing the composite base material so that a decrease in the void ratio does not exceed 20 vol % in one heating and pressurizing treatment.

[4] The composite base material according to any one of [1] to [3], wherein the composite base material is obtained by heating and pressurizing a mat-form material in which a carbon fiber mat and a thermoplastic resin are combined, and the composite base material is a composite base material having a void ratio of from more than 7 vol % to less than 80 vol %, obtained by preparing a composite base material having a void ratio of from 40 vol % to less than 60 vol % and further heating and pressurizing the composite base material so that a decrease in the void ratio does not exceed 30 vol % in one heating and pressurizing treatment.

[5] The composite base material according to any one of [1] to [4], wherein a width of the carbon fibers is 5 mm or less and a thickness of the carbon fibers is ½ or less of the width.

[6] The composite base material according to any one of [1] to [5], wherein a carbon fiber bundle (A) constituted by the carbon fibers of not less than a critical number of single fibers, defined by the following formula (1), is present in the carbon fibers:

$$\text{Critical number of single fibers} = 600/D \quad (1)$$

wherein D is an average fiber diameter (μm) of single carbon fibers.

[7] The composite base material according to [6], wherein a ratio of the carbon fiber bundle (A) to a total amount of the carbon fibers contained in the composite base material is more than 0 vol % to less than 99 vol %.

[8] The composite base material according to [6] or [7], wherein an average number (N) of fibers in the carbon fiber bundle (A) satisfies the following formula (2):

$$0.7 \times 10^4/D^2 < N < 2 \times 10^5/D^2 \quad (2)$$

wherein D is the average fiber diameter (μm) of single carbon fibers.

[9] The composite base material according to any one of [1] to [8], wherein the carbon fibers are in a mat-form material in which the carbon fibers are two-dimensionally randomly oriented.

[10] A composite material obtained by pressurizing the composite base material according to any one of [1] to [9].

[11] The composite material according to [10], wherein a void ratio of the composite material is from 0 to 7 vol %.

Advantageous Effects of Invention

The composite base material of the present invention is suitable as an intermediate of a carbon fiber-reinforced composite material (hereinafter, sometimes simply referred to as a composite material) and excellent in the handleability and in-plane isotropy.

DESCRIPTION OF EMBODIMENTS

Figure 1:
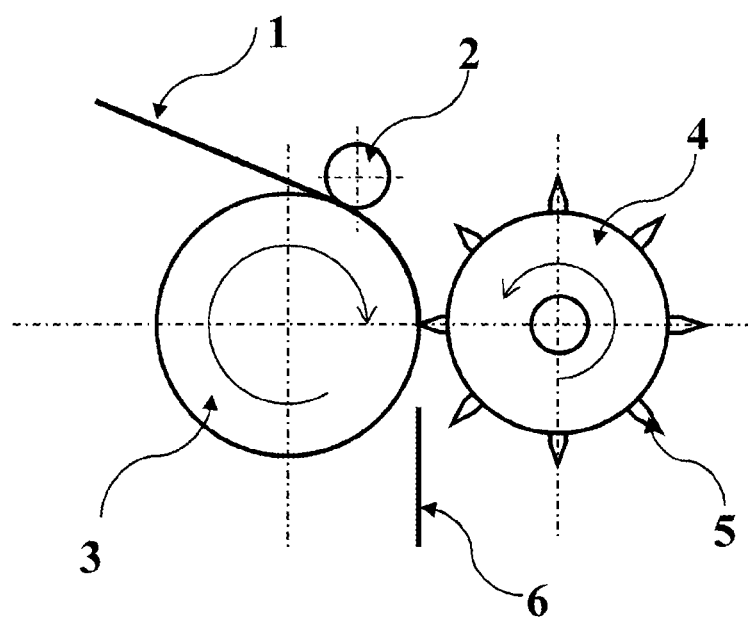
FIG. 1 is a schematic view of a cutting step.

The embodiments of the present invention are sequentially described below. In the following, as regards the present invention, the term "weight" is used in some places, but the weight always means the mass.

[Composite Base Material]

In the composite base material of the present invention, from 3 to 1,000 parts by mass of a thermoplastic resin is firmly fixed to 100 parts by mass of a carbon fiber having an average fiber length of 3 mm or more and 100 mm or less, and a void ratio of the composite base material is from more than 7 vol % to less than 100 vol %.

The void ratio is a ratio of air contained in the composite base material of the present invention and is defined based on the following formula (3) and expressed by the percentage on the volume basis (vol %).

$$\text{Void ratio (Vr)} = (t_2 - t_1)/t_2 \times 100 \quad (3)$$

(Here, $t_1$ is a theoretical thickness when the composite base material has a void ratio of 0 vol %, which is calculated from the amounts of the carbon fiber and thermoplastic resin contained in the composite base material, and $t_2$ is the average thickness of the composite base material).

In formula (3), as to $t_1$ and $t_2$, a numerical quantity expressed by various length units such as millimeter (mm), centimeter (cm) and meter (m) may be employed, but of course, $t_1$ and $t_2$ are numerical quantities expressed by the same unit. In addition, $t_1$ and $t_2$ are the thicknesses of the composite base material per the same specific area of the composite base material.

The void ratio of the composite base material of the present invention is from more than 7 vol % and less than 100 vol % as described above but is preferably less than 90 vol %, more preferably 80 vol % or less, still more preferably 75 vol % or less, yet still more preferably 50 vol % or less, and even yet still more preferably 40 vol % or less.

Furthermore, the void ratio of the composite base material of the present invention is preferably from 10 vol % or more and less than 100 vol %, more preferably from 10 vol % or more and less than 90 vol %, still more preferably from 10 vol % or more and 80 vol % or less, yet still more preferably 20 vol % or more and 75 vol % or less, even yet still more preferably 25 vol % or more and 50 vol % or less, and above all, preferably 30 vol % or more and 40 vol % or less.

In the composite base material of the present invention, a thermoplastic resin is in a state of being firmly fixed to a carbon fiber. The state of being firmly fixed is obtained, as described later with respect to the method for producing the composite base material of the present invention, by the following processes, or the like. The processes include a process of supplying a thermoplastic resin sheet or molten thermoplastic resin to a mat-form material in which carbon fibers are entangled with each other (hereinafter, sometimes referred to as a carbon fiber mat) and applying heat and pressure to perform impregnation and a process of heating a mixed mat-form material in which a thermoplastic resin powder or fiber is attached to or entangled with a mat-form material in which carbon fibers are entangled with each other (in the present invention, the mixed mat-form material is referred to as a mixed random mat and hereinafter, except as otherwise noted, a random mat used indicates the mixed mat-form material) at a temperature not less than the softening point (which indicates, in the present invention, the melting point of the thermoplastic resin when the resin is crystalline, and indicates the glass transition temperature when the resin is amorphous) of the thermoplastic resin and applying pressure in combination depending on the case. The state of being firmly fixed indicates a state where a thermoplastic resin is caused to reach all parts between fiber bundles as well as inside the fiber bundle in the mat-form material of carbon fiber and be integrated with the carbon fiber. In the composite base material of the present invention, when carbon fiber mats or random mats including carbon fibers two-dimensionally randomly oriented, this is very preferred, because the in-plane isotropy of the composite base material is excellent and the composite material obtained from the composite base material is also excellent in the in-plane isotropy.

The composite base material of the present invention is not particularly limited in its shape, but examples thereof include a plate-shaped material having a smaller dimension in the thickness direction than one in the plane direction, in particular a substantially rectangular plate-shaped material, which is representative, and the plate-shaped material may be a so-called long material.

A mat where a solid sheet or sheet-like melt of a thermoplastic resin is layered on a carbon fiber mat is referred to as a layered random mat.

In the present invention, the term "composite random mat" is used as a broader concept encompassing the above-described mixed random mat and layered random mat and refers to a mat-form material where a carbon fiber mat and a thermoplastic resin are combined by mixing, stacking, or the like.

[Carbon Fiber]

The carbon fiber constituting the composite base material of the present invention is discontinuous and has an average fiber length of 3 mm or more and 100 mm or less. The composite base material of the present invention is characterized by containing a carbon fiber that is long to a certain extent, and thereby being capable of developing a reinforcing function, and the average fiber length of carbon fibers is preferably from 5 mm or more and 100 mm or less, more preferably 10 mm or more and 100 mm or less, still more preferably 15 mm or more and 80 mm or less, yet still more preferably 20 mm or more and 60 mm or less. Although the method for producing the composite base material of the present invention is described later, when cutting a carbon strand in the cutting step thereof, the strand can be cut into a constant cut length, for example, 50 mm. The average fiber length of the carbon fibers in a composite base material obtained using the carbon fiber strand after cutting becomes the cut length above.

In the composite base material of the present invention, the carbon fiber a real weight is preferably from 25 $g/m^2$ or more and 10,000 $g/m^2$ or less, more preferably 25 $g/m^2$ or more and 5,000 $g/m^2$ or less, still more preferably from 25 $g/m^2$ or more and 3,000 $g/m^2$ or less.

The average fiber diameter of the carbon fibers contained in the composite base material of the present invention is preferably from 3 to 12 μm, more preferably from 5 to 9 μm, still more preferably from 5 to 7 μm. A carbon fiber adhered to a sizing agent is preferably used. The amount of the sizing agent adhered is preferably more than 0 parts by mass to 10 parts by mass, per 100 parts by mass of the carbon fiber.

In addition, the carbon fiber contained in the composite base material of the present invention is preferably a fiber subjected to fiber opening. The fiber opening as defined herein means that, as described later by an example regarding the method for producing the composite base material of the present invention, a carbon fiber strand after adjusting the bundle of carbon fibers to be wide and thin is, for example, passed through a fiber separating step, or the like, and thereby adjusted to a certain ratio of the fiber bundle to the amount of single fibers and a certain number of collected fibers in fiber bundles. The composite base material of the present invention is preferably a mat-form material in which carbon fibers, that is, carbon fiber bundles or single carbon fibers, are entangled with each other. In particular, a mat-form material in which as seen in the case of spraying and depositing carbon fiber bundles and the like after cutting the carbon fiber strand into a specific length, the carbon fiber bundles and the like are deposited while being two-dimensionally entangled with each other to form a pseudo flat plane and individual carbon fibers are oriented in the pseudo flat plane, that is, carbon fibers or the like are two-dimensionally randomly oriented, is preferable for the composite base material of the present invention. This is because the two-dimensionally randomly oriented state of carbon fibers or the like in the mat-form material is maintained also in the composite base material and from such a composite base material, a composite material excellent in the in-plane isotropy and mechanical property can be obtained.

The carbon fiber includes a polyacrylonitrile-based (hereinafter, sometimes simply referred to as PAN-based) carbon fiber, a pitch-based carbon fiber, a rayon-based carbon fiber, or the like depending on the precursor thereof, and all of these types can be used for the composite base material of the present invention, but among others, a PAN-based carbon fiber is preferred in view of physical properties and cost.

In the present invention, the carbon fiber strand is a bundle of long carbon fibers, where carbon fiber filaments (single fibers) are collected with the number of single fibers being about 1,000 or more, and indicates a bundle that can be wound onto a bobbin (a cylindrical spool) to be transported or handled and has a length long enough to enable a continuous processing for a given time in the later-described widening step or the like.

[Degree of Fiber Opening]

In general, the commercially available carbon fiber is in the form of a fiber bundle where from thousands to ten thousands of filaments (single fibers) are collected. Above all, in the case of obtaining a thin-walled composite material, when the carbon fiber in the form of a fiber bundle is used as it is, the entangled portion of fibers becomes locally thick and a thin-walled article cannot be obtained. Therefore, use of a carbon fiber after fiber opening is important, and it is preferred that the composite base material of the present invention is formed as a composite base material having a controlled degree of fiber opening and contains a carbon fiber bundle constituted by carbon fibers of not less than a specific number and another opened carbon fiber in a specific ratio.

In the description of the present invention, the term "fiber separating" is also sometimes used below, and the fiber separating indicates that a carbon fiber bundle, particularly, a carbon fiber strand, is separated into two or more carbon fiber bundles. When a carbon fiber strand is processed by both of the later-described widening and the fiber separating, an opened carbon fiber (strand) is obtained.

That is, the carbon fiber in the composite base material of the present invention is preferably constituted by a carbon fiber bundle (A) constituted by carbon fibers of not less than a critical number of single fibers defined by the following formula (1), and another opened carbon fiber, i.e., a single fiber or a fiber bundle constituted by carbon fibers of less than the critical number of single fibers.

$$\text{Critical number of single fibers} = 600/D \quad (1)$$

(Here, D is the average fiber diameter (μm) of single carbon fibers.

As for the carbon fiber in the composite base material of the present invention, the ratio of the carbon fiber bundle (A) to the total amount of the carbon fibers contained is preferably more than 0 vol % and less than 99 vol %. If the ratio of the carbon fiber bundle (A) is 99 vol % or more, the entangled portion of fibers becomes locally thick and a thin-walled article may not be obtained. The ratio of the carbon fiber bundle (A) is more preferably from 30 vol % or more and less than 95 vol %, still more preferably 50 vol % or more and less than 90 vol %.

For controlling the content of the carbon fiber bundle to the target ratio, in the later-described preferable production method, the content can be controlled, for example, by the pressure of air blown in the fiber opening step or the like. In addition, the content can be controlled by adjusting the size, for example, the bundle width or the number of fibers per width, of the fiber bundle subjected to a cutting step. Specifically, the method therefor includes a method of widening fiber bundle and providing a slit step before the cutting step and further includes a method of cutting fiber bundle by using a so-called fiber separating knife in which many short blades are arranged, and a method of slitting fiber bundle simultaneously with cutting. Preferable fiber opening conditions are described in the section of the fiber opening step.

Furthermore, in the composite base material of the present invention, the average number (N) of fibers in the carbon fiber bundle (A) preferably satisfies the following formula (2).

$$0.7 \times 10^4/D^2 < N < 2 \times 10^5/D^2 \quad (2)$$

(Here, D is the average fiber diameter (μm) of single carbon fibers.

If the average number (N) of fibers in the carbon fiber bundle (A) is $0.7 \times 10^4/D^2$ or less, a high fiber volume content (VD becomes difficult to be obtained. If the average number (N) of fibers in the carbon fiber bundle (A) is $2 \times 10^5/D^2$ or more, a thick portion is locally generated to tends to cause a void.

For controlling the average number (N) of fibers in the carbon fiber bundle (A) to the target numerical quantity, in the later-described preferable production method, the average number can be controlled by adjusting the size, for example, the bundle width or the number of fibers per width, of the fiber bundle subjected to a cutting step. Specifically, the method therefor includes a method of widening the fiber and providing a slit step before the cutting step. In addition, the average number (N) of fiber bundles in the carbon fiber bundle (A) can also be controlled by adjusting the degree of fiber opening of the cut fiber bundle, for example, by the pressure of air blown in the fiber opening step. Preferable conditions are described in the paragraphs of the cutting step and fiber opening step.

In this way, by using a composite base material including a carbon fiber bundle (A) constituted by carbon fibers of not less than a critical number of single fibers defined by formula (1) and a carbon fiber (B) in a single fiber state or constituted by carbon fibers of less than the critical number of single fibers at the same time, a composite material with good fiber filling efficiency, little scattering in fiber density, and more excellent mechanical strength can be provided.

In addition, a carbon fiber bundle constituted by carbon fibers of not less than a specific number of carbon fibers and another opened carbon fiber are present together in a specific ratio, and whereby the content of the carbon fiber in the composite base material, i.e., the fiber volume content ratio (Vf) can be increased.

Specifically, in the case where the average fiber diameter of the carbon fibers constituting the composite base material is from 5 to 7 μm, the critical number of single fibers is from 86 to 120.

In the case where the average fiber diameter of the carbon fiber is 5 μm, the average number of fibers in the fiber bundle is from more than 280 to less than 8,000, preferably from 600 to 6,000. In the case where the average fiber diameter of the carbon fiber is 7 μm, the average number of fibers in the fiber bundle is from more than 142 to less than 4,082, preferably from 400 to 4,000. The composite base material of the present invention can have various thicknesses and by using such a composite base material, even a shaped article having a final thickness of approximately from 0.2 to 4 mm can be obtained.

[Thermoplastic Resin]

In the composite base material of the present invention, a thermoplastic resin is present in the state of being firmly fixed to a carbon fiber, and the content of the thermoplastic resin is from 3 to 1,000 parts by mass per 100 parts by mass of the carbon fiber, preferably from 50 to 500 parts by mass per 100 parts by mass of the carbon fiber, still more preferably from 50 to 300 parts by mass per 100 parts by mass of the carbon fiber.

A preferable method for producing the composite base material of the present invention is described in detail later, but the thermoplastic resin is used in a fiber form, particle form, sheet form in a molten state, or in the form of two or more kinds of these states, and after obtaining a composite random mat, the composite random mat is heated and pressurized, and whereby the thermoplastic resin is melted in the composite random mat and impregnates between carbon fibers to produce a composite base material. In the case where the thermoplastic resin used is in the particle shape, the average particle diameter is preferably from 0.01 μm to 3 mm, more preferably from 0.1 μm to 1 mm, still more preferably from 1 μm to 0.8 mm. The particle size distribution of the particle-shaped thermoplastic resin is not particularly limited, but a resin with a small distribution is more preferred for the purpose of obtaining a more homogeneous composite base material. The particle-shaped thermoplastic resin can be preferably used in the present invention as a resin having the objective particle size distribution by applying a treatment such as classification. As for the fiber-shaped thermoplastic resin, the fineness is preferably from 100 to 5,000 dtex, more preferably from 1,000 to 2,000 dtex. The average fiber length of the particle-shaped thermoplastic resin is preferably from 0.5 to 50 mm, more preferably from 1 to 10 mm. In the case of a sheet-shaped thermoplastic resin, the sheet is disposed on one surface or both surfaces of a mat satisfying the above-described embodiments of the carbon fiber. The thickness of the sheet-shaped thermoplastic resin is appropriately set according to the thickness of the final shaped product and the content of the thermoplastic resin relative to the carbon fiber but is preferably from 0.1 to 10 mm, more preferably from 0.5 to 4 mm.

The thermoplastic resin is not particularly limited in its kind but, as described above, a resin capable of taking on its shape in fiber, particle or sheet form is preferred, and a resin may be used alone or a plurality of kinds of resins may be used. The thermoplastic resin includes, for example, vinyl chloride resin, vinylidene chloride resin, vinyl acetate resin, polyvinyl alcohol resin, polystyrene resin, acrylonitrile-styrene resin (AS resin), acrylonitrile-butadiene-styrene resin (ABS resin), acrylic resin, methacrylic resin, polyethylene resin, polypropylene resin, polyamide 4 resin, polyamide 6 resin, polyamide 11 resin, polyamide 12 resin, polyamide 26 resin, polyamide 46 resin, polyamide 66 resin, polyamide 69 resin, polyamide 610 resin, polyamide 611 resin, polyamide 612 resin, polyamide 1212 resin, polyamide 6T resin, polyamide 6I resin, polyamide 11 resin, polyamide 912 resin, polyamide 1012 resin, polyamide 9T resin, polyamide 9I resin, polyamide 10T resin, polyamide 10I resin, polyamide 11T resin, polyamide 11I resin, polyamide 12T resin, polyamide 12I resin, polyamide MXD6 resin, polyacetal resin, polycarbonate resin, polyethylene terephthalate resin, polyethylene naphthalate resin, polytrimethylene terephthalate resin, polytrimethylene naphthalate resin, polybutylene naphthalate resin, polybutylene terephthalate resin, poly(1,4-cyclohexanedimethanol terephthalate), polylactic acid resin, polyarylate resin, polyvinyl naphthalate resin, polyphenylene ether resin, polyphenylene sulfide resin, polysulfone resin, polyethersulfone resin, polyether ether ketone resin, a copolymer or modification product thereof, and a blend or polymer alloy of two or more kinds of these resins.

Among these thermoplastic resins, preferred are a polyamide resin such as polyamide 4 resin, polyamide 6 resin, polyamide 11 resin, polyamide 12 resin, polyamide 26 resin, polyamide 46 resin, polyamide 66 resin, polyamide 69 resin, polyamide 610 resin, polyamide 611 resin, polyamide 612 resin, polyamide 1212 resin, polyamide 6T resin, polyamide 6I resin, polyamide 11 resin, polyamide 912 resin, polyamide 1012 resin, polyamide 9T resin, polyamide 9I resin, polyamide 10T resin, polyamide 10I resin, polyamide 11T resin, polyamide 11I resin, polyamide 12T resin, polyamide 12I resin and polyamide MXD6 resin, a polyester resin such as polyethylene terephthalate resin, polyethylene naphthalate resin, polytrimethylene terephthalate resin, polytrimethylene naphthalate resin, polybutylene naphthalate resin, polybutylene terephthalate resin, poly(1,4-cyclohexanedimethanol terephthalate), polylactic acid resin and polyarylate resin, a polycarbonate resin, a copolymer or modification product thereof, and a blend or polymer alloy of two or more kinds of these resins.

[Other Agents]

In the following, the thermoplastic resin contained in the composite base material of the present invention is sometimes simply referred to a matrix resin.

In the composite base material of the present invention, various fibrous fillers such as an inorganic fiber other than carbon fiber, typified by a glass fiber, a ceramic fiber and a metal fiber, and an organic fiber typified by an aramid fiber, non-fibrous fillers, or various additives such as flame retardant, UV-resistant agent, pigment, release agent, softening agent, plasticizer and surfactant, may be incorporated as long as the object of the present invention is not impaired.

[Production Method]

A preferable method for obtaining the composite base material of the present invention is described below. For example, the composite base material of the present invention may be preferably produced through the following steps 1 to 5:

1. a widening step: a step of widening a carbon fiber strand,
2. a cutting step: a step of cutting the carbon fiber strand,
3. a spraying step: a step of spreading/spraying the widened and cut carbon fiber strand alone to form a carbon fiber mat, or a step of spreading/spraying the widened and cut carbon fiber strand together with a fibrous or powdery thermoplastic resin to form a (mixed) random mat that is a mixture thereof,
4. a conveying step: a step of conveying the (mixed) random mat, or a step of conveying the carbon fiber mat and in the course of conveyance, supplying a sheet-shaped molten thermoplastic resin to one surface or both surfaces of the carbon fiber mat, and
5. a heating/pressurizing step: a step of heating and pressurizing the conveyed (mixed) random mat or the conveyed carbon fiber mat adhered to a sheet-form molten thermoplastic resin (layered random mat), to obtain a composite base material.

[Widening Step]

A strand of a high-function fiber such as carbon fiber exerts further effectively its function when widened, i.e., when fiber bundles are widely and thinly arranged, for example, by applying a physical force. In the production of the composite material of the present invention, the carbon fiber strand is preferably widened. The step of widening the carbon fiber strand, i.e., making the carbon fiber bundle wide and thin, may be continuous or discontinuous with a step subsequent to this step.

As the method for widening the carbon fiber strand when producing the composite base material of the present invention, a known method may be employed. For example, a plurality of carbon fiber strands drawn out from a bobbin are continuously contacted under a specific tension with a plurality of bars that are disposed orthogonally to the running direction of the strand and each has a circular cross-sectional profile, and whereby the carbon fiber strand can be widened in multiple stages. The widened width is preferably from 1.1 to 5 times, more preferably from 1.1 to 3 times, relative to the width of the carbon fiber strand drawn out from the bobbin.

[Cutting Step]

The step of cutting the widened carbon fiber strand is described below. As the method for cutting the carbon fiber strand, a known method may be employed, but a method using a knife such as rotary cutter is preferred.

Figure 2:
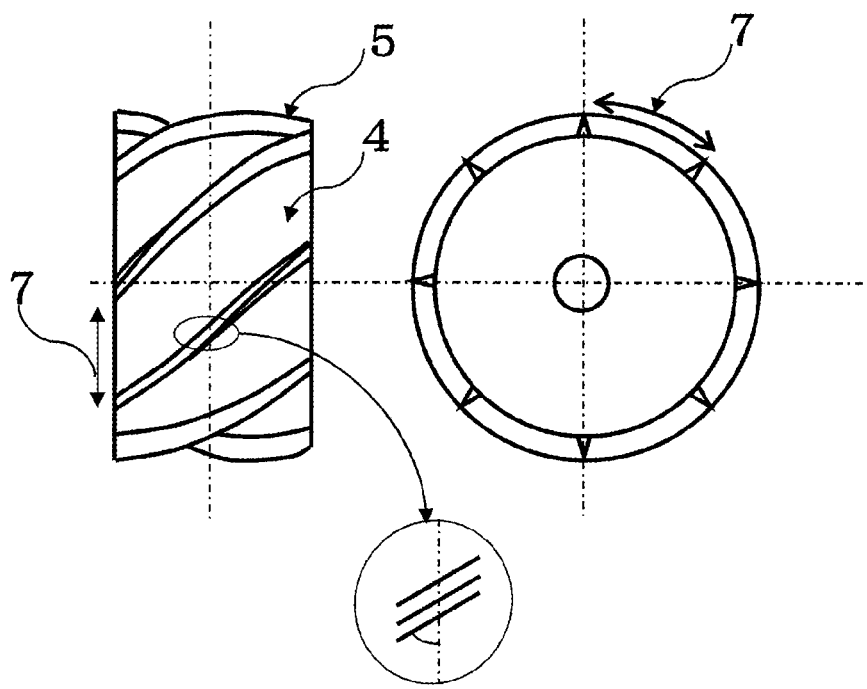
FIG. 2 is a schematic view showing a front surface and a cross-sectional surface in one example of a rotary cutter having a spiral knife.
Figure 3:
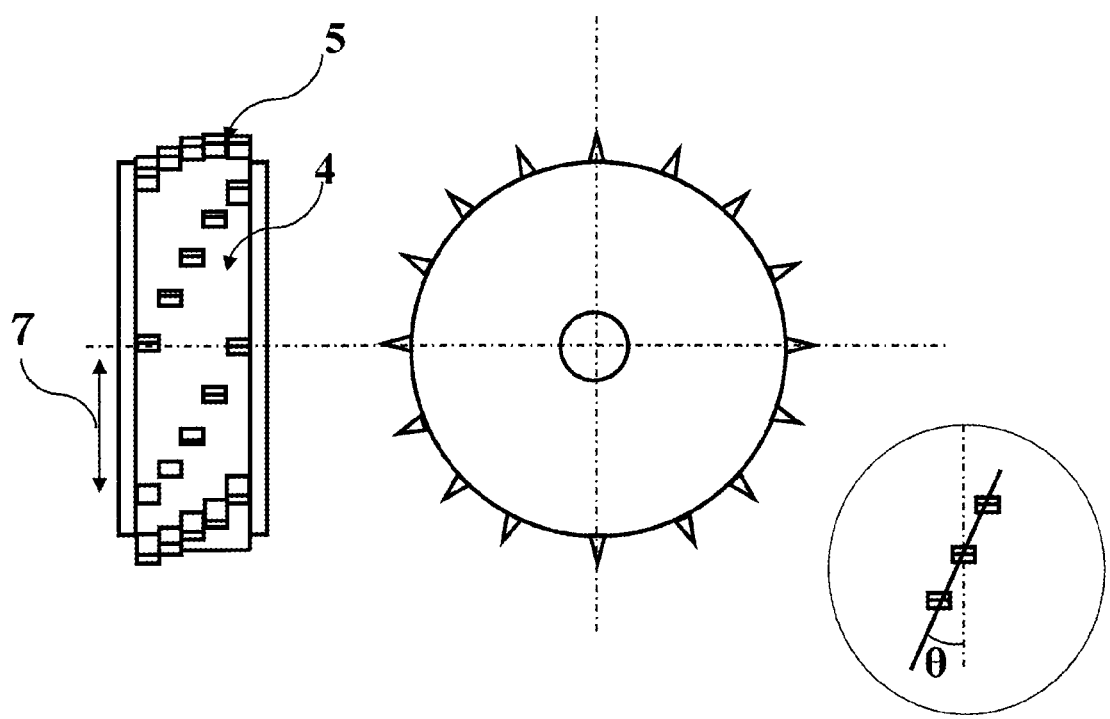
FIG. 3 is a schematic view showing a front surface and a cross-sectional surface in one example of a rotary cutter having a fiber separating knife.

The rotary cutter is preferably a cutter provided with a spiral knife at an angle specified or with a so-called fiber separating knife having arranged therein a plurality of short blades. FIG. 1 shows a specific schematic view of the cutting step. FIG. 2 shows one example of the rotary cutter having a spiral knife, and FIG. 3 shows one example of the rotary cutter having a fiber separating knife.

The average number (N) of fibers in the carbon fiber bundle (A) is preferably controlled by adjusting the size, for example, the bundle width or the number of fibers per width, of the fiber bundle subjected to the cutting step so as to fall in the preferred range of the present invention.

As the fiber bundle strand for cutting, a strand previously having a number of fiber bundles in the range of formula (2) is preferably used. However, in general, as the number of fiber bundles is smaller, the cost of the carbon fiber is higher. Therefore, in the case of using an inexpensively available carbon fiber strand having a large number of fiber bundles, the carbon fiber strand for use in the cutting step is preferably subjected to the cutting step after adjusting the width or the number of fibers per width. Specifically, the method therefor includes a method where the carbon fiber strand is widened in the width and thereby thinned through the widening step above and then subjected to the cutting step, and a method where the carbon fiber strand is subjected to the cutting step through slitting process after the widening step. In the method of carrying out slitting process, the carbon fiber strand is subjected to the cutting step after previously adjusting the number of fiber bundles to the range of formula (2) and therefore, an ordinary blade having no special mechanism, such as flat blade and spiral blade, can be used as the cutter.

In addition, there is a method of cutting the fiber bundle by using a fiber separating knife, and a method of slitting the fiber bundle simultaneously with cutting by using a cutter having a slit function.

In the case of using a fiber separating knife, the average number (N) of fibers can be decreased by using a knife with a narrow width, or on the contrary, the average number (N) of fibers can be increased by using a knife with a wide width.

Figure 4:
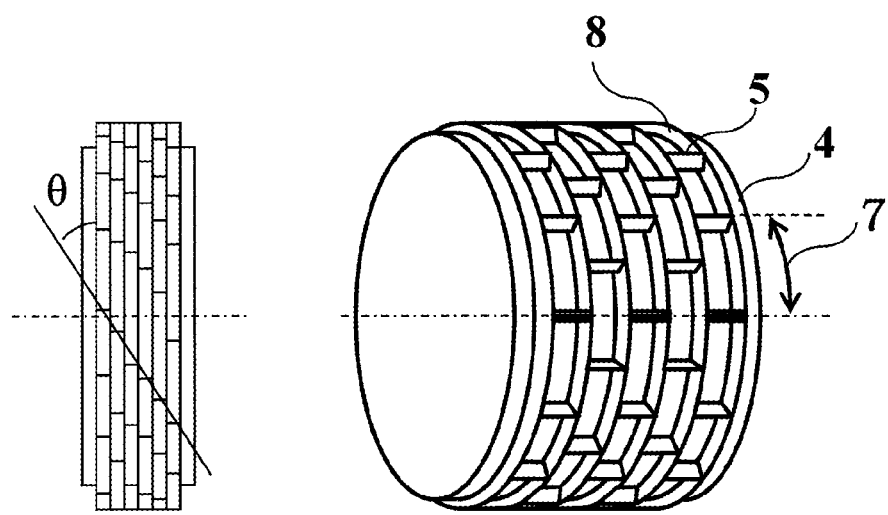
FIG. 4 is a schematic view showing one example of a fiber separating cutter having a blade that is parallel to the fiber direction and has a slit function, in addition to a blade perpendicular to the fiber direction.

As for the cutter having a slit function, FIG. 4 shows an example of a fiber separating cutter having a blade that is parallel to the fiber direction and has a slit function, in addition to a blade perpendicular to the fiber direction. In this fiber separating cutter, short blades perpendicular to the fiber direction are spirally provided at a certain interval, and the fiber can be cut by these blades and concurrently slit by the blade perpendicular to the fiber direction. In the fiber separating cutter shown in FIG. 4, as illustrated in the figure, the angle θ between the circumferential direction of the rotary cutter and the arranging direction of the knife is also constant.

For stably developing mechanical characteristics of the finally obtained composite material and obtaining a composite material excellent in the surface appearance, the unevenness in fiber density has a great effect. In a rotary cutter having arranged therein ordinary flat blades, the carbon fiber is cut discontinuously and when the carbon fiber is introduced into a spraying step, unevenness is generated in carbon fiber a real weight. Therefore, the carbon fiber is continuously cut by using a knife at an angle specified, and whereby spraying with small unevenness in the fiber density can be achieved. The knife angle for continuously cut the carbon fiber is geometrically calculated from the width of the carbon fiber used and the pitch of blades, and these width and pitch are preferably in the relationship of the following formula (4). The pitch of blades in the circumferential direction is reflected directly on the fiber length of the carbon fiber.

Fiber length (pitch of blades) of carbon fiber=width of carbon fiber strand×tan(90-θ) (4)

Here, θ is the angle between the circumferential direction and the arranging direction of knife.

FIGS. 2 to 4 are examples of the knife at an angle specified, and the angle θ between the circumferential direction and the arranging direction of knife in these examples of the cutter is shown in the figures.

In the case where the carbon fiber is cut to a specific length in this step and without cutting the carbon fiber thereafter, the composite base material of the present invention if formed, the average fiber length of the carbon fiber in the composite base material becomes the length at the time of cutting above.

[Spraying Step]

The spraying step is a step of spraying carbon fibers obtained after the carbon fiber strand is separated and cut to a constant length. In the spraying step, a fibrous or powdery thermoplastic resin and the carbon fiber may be sprayed at the same time. By spraying these cut carbon fiber and the like on a breathable support, a carbon fiber mat or a random mat suitable for the composite base material of the present invention can be obtained.

In the case of feeding a thermoplastic resin and the carbon fiber at the same time in the spraying step, the feed rate of the thermoplastic resin is preferably from 3 to 1,000 parts by mass per 100 parts by mass of the carbon fiber, more preferably from 50 to 500 parts by mass per 100 parts by mass, still more preferably from 50 to 300 parts by mass per 100 parts by mass.

In the spraying step, a mat having a desired thickness can be obtained by appropriately selecting the feed rate of the carbon fiber or the feed rates of the carbon fiber and the thermoplastic resin.

Here, the carbon fibers or the carbon fibers and fibrous or powdery thermoplastic resin are preferably sprayed to be oriented two-dimensionally. For applying opened carbon fibers while being oriented two-dimensionally, the spraying method and the following fixing method are important. In the spraying method of carbon fibers, a taper tube in the form of a cone or the like is preferably used. Within the tube of a cone or the like, air diffuses and its flow rate in the tube decreases. By utilizing this Venturi effect, carbon fibers are imparted with a rotational force and can be spread and sprayed.

In the above-described widening step and cutting step, the degree of opening defined in the present invention is adjusted, but the degree of opening can also be additionally adjusted in the spraying step. The fiber bundle is opened by blowing air to the carbon fiber introduced into the tube. More specifically, this is a step of continuously introducing cut carbon fibers into the tube, blowing a pressure air directly to the fibers, and thereby opening the fiber bundle separately. The degree of fiber opening can be appropriately controlled by the pressure of air or the like.

A preferable method for opening the carbon fiber is a method of blowing a compressed air directly to the carbon fiber. Specifically, air is blown from a compressed air blowing hole preferably at a wind speed of 1 to 500 m/sec, and whereby the carbon fiber can be opened. Preferably, a hole of about 1 mm in diameter is formed at several portions in the tube through which the carbon fiber passes, and a pressure of approximately from 0.01 to 0.8 MPa is applied from the outside to directly blow the compressed air to the fiber bundle, and whereby the fiber bundle can be opened to an arbitrary degree of fiber opening.

In order to fix the carbon fiber and the powdery or fibrous thermoplastic resin in the carbon fiber mat or random mat, air is preferably suctioned from beneath the deposit portion of a breathable support on which the carbon fiber or the carbon fiber and thermoplastic resin are deposited, and thereby fixing the carbon fiber and the thermoplastic resin. Thanks to this suctioning from beneath the deposit surface, a mat having highly two-dimensional orientation can be obtained. Meanwhile, the void ratio of the carbon fiber mat or random mat after fixing is 90% or more. The fixing as used herein means a state where a thermoplastic resin powder or fiber is firmly bit in the mat in which carbon fibers are entangled and the thermoplastic resin powder or fiber does not easily fall off even when the mat is conveyed.

In this connection, when a part of the thermoplastic resin particle or the like passes through the support due to configuration of the breathable support and does not remain in the mat, in order to prevent this, it is also possible to separately set a nonwoven fabric or the like on the support surface and blow the carbon fiber and thermoplastic resin particle and the like onto the nonwoven fabric and fixed.

In this case, when the nonwoven fabric is constituted by the same resin as the thermoplastic resin, the nonwoven fabric need not be separated from the deposited mat and by processing the mat in the subsequent heating/pressurizing step, a fiber constituted by the nonwoven fabric can also be utilized as a part of the thermoplastic resin to be served as the matrix of a composite material.

By the above-described processing in the spraying step, a carbon fiber mat or random mat in which carbon fibers are two-dimensionally randomly oriented, can be obtained.

[Conveying Step]

The conveying step is a step of conveying the random mat obtained in the spraying step above or a step of conveying the carbon fiber mat obtained in the spraying step above and in the course of conveyance, feeding a sheet form thermoplastic resin in a molten state to one surface or both surfaces of the carbon fiber mat.

When the breathable support described in the spraying step is constituted by a conveyor composed of a net and the carbon fiber or a mixture of the carbon fiber and the thermoplastic resin is deposited thereon while continuously moving the support in one direction, and thereby a carbon fiber mat or a random mat can be continuously formed.

In the case of spraying only carbon fibers in the spraying step, a mechanism of feeding the sheet form thermoplastic resin in a molten state to one surface or both surfaces of the carbon fiber mat is disposed. The method for feeding the molten thermoplastic resin is a method where a thermoplastic resin to be melted/conveyed by an extruder or the like, or a thermoplastic resin containing various additives as needed, is fed onto the carbon fiber mat in a sheet form and in a molten state at a specific feed rate for a specific time to obtain one having given width and thickness by using a T-die or the like. In the case of feeding the thermoplastic resin onto both surfaces of the carbon fiber mat, this step is practiced by feeding the molten thermoplastic resin sheet onto a heat-resistant belt by the method above, continuously disposing the carbon fiber mat thereon while keeping its form, and feeding the molten thermoplastic resin sheet similarly also onto the carbon fiber mat.

[Heating/Pressurizing Step]

The heating/pressurizing step is a step of heating and pressurizing the random mat conveyed as above or the carbon fiber mat adhered to the sheet form thermoplastic resin in a molten state to obtain a composite base material having a void ratio of more than 7 vol % and less than 100 vol %.

For making up the composite base material of the present invention by heating/pressurizing the above-described random mat or the like a known method of heating/pressurizing a thermoplastic resin or a composite material thereof can be used, and the method may either a method by a batch-type apparatus or a method by a continuous apparatus.

The pressurizing method in the heating/pressurizing step is not particularly limited but includes, preferably, a method involving control of the gap or applied pressure by a roller, a belt press or the like. In the case of applying pressure by means of a roller, the pressure is preferably applied by previously adjusting the gap distance of rollers so as to provide a composite base material having an objective void ratio. As a specific example, in the case where a pair of upper and lower rollers located with a gap is used as the pressurizing apparatus, and the random mat or the like is held in and passed through the gap between the paired rollers and thereby pressurized, in formula (3):

$$\text{Void ratio (Vr)} = (t_2 - t_1)/t_2 \times 100 \tag{3}$$

(wherein $t_1$ is a theoretical thickness when the composite base material has a void ratio of 0 vol %, which is calculated from the amounts of carbon fiber and thermoplastic resin contained in the composite base material, and $t_2$ is the average thickness of the composite base material), the gap distance of roller pairs can be regarded as the average thickness $t_2$ of the obtained composite base material. That is, in the case of applying the pressure by a roller, the gap distance of roller pairs corresponding to the objective void ratio can be determined from the relationship of formula (3). In the case of using a pressurizing method other than this example, the gap distance of jigs holding the composite base material can also be regarded as the average thickness $t_2$ of the obtained composite base material.

The heating method in the heating/pressurizing step is not particularly limited but is preferably heating with an infrared heater or hot air or heating on a heated roll or heated plate. The heating temperature is not particularly limited, but the temperature is preferably set so that the temperature of the base material such as random mat is the melting point of matrix resin or more and the melting point plus 100° C. or less, more preferably the melting point of matrix resin or more and the melting point plus 50° C. or less.

Figure 5:
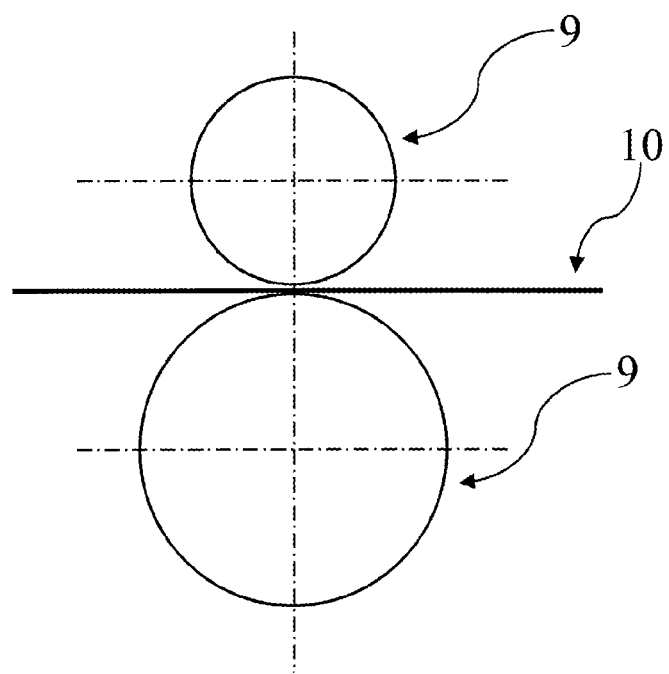
FIG. 5 is a schematic view showing one example of the heating/pressurizing step.

In the heating/pressurizing step, the processing can be more efficiently performed by previously heating the base material such as random mat to a temperature not less than the melting point of the thermoplastic resin as the matrix or to a temperature not less than the glass transition temperature thereof in the case where the thermoplastic resin is amorphous. An apparatus component part, such as roller and belt, used in the heating/pressurizing step and to be in contact with the substrate such as random mat, may be adjusted to a temperature not less than the softening point of the thermoplastic resin as the matrix or to a temperature less than the softening point. It is more preferable to perform a continuous heating/pressurizing step by adjusting at least either one of the components above to a temperature not less than the melting temperature of the thermoplastic resin. FIG. 5 shows a schematic view of the configuration example in the case of applying heat/pressure by means of a roller.

As the heating/pressurizing method for obtaining the composite base material of the present invention, a method where a plurality of roller pairs are provided in a heating furnace having a heating source such as the above-described infrared heater or hot air and the random mat, etc. is held in and passed through the gap between the paired rollers, is simple and preferred.

The heating/pressurizing treatment to the random mat, etc. may be performed once or a plurality of times, and it may be also possible that a composite base material having a void ratio of from more than 7 vol % to less than 100 vol % of the present invention is obtained by one or more heating/pressurizing treatments and this composite base material is further heated/pressurized to obtain a composite base material having a lower void ratio of the present invention. Hereinafter, in the present invention, when performing the heating/pressurizing treatment a plurality of times, the treatment of first heating and pressurizing a random mat or a carbon fiber mat adhered to the sheet form thermoplastic resin in a molten state is sometimes referred to as the first stage, and the treatment of further heating/pressurizing the composite base material obtained by the treatment at the first stage is sometimes referred to as the second stage.

The composite base material of the present invention is preferably a composite base material obtained by performing the heating/pressurizing treatment a plurality of times as described above, because when the void ratio of the composite base material is reduced to the target value by a plurality of heating/pressurizing treatments, a composite base material excellent particularly in the in-plane isotropy can be obtained. In the following, as a preferred embodiment, for example, a plurality of heating/pressurizing treatments for a random mat having a void ratio of 90 vol % or more is illustrated.

At the first stage, the random mat having a void content of 90 vol % or more is adjusted to a void ratio of from 75 vol % or more and less than 90 vol %. This corresponds to adjusting the thickness of the random mat to 4 times or more and less than 10 times relative to the thickness when the void ratio is 0 vol %. The pressure applied to the base material here is preferably adjusted in the range of from 0.01 to 2.0 MPa. If the void ratio is largely reduced by the decrement above or more, an excess pressure is applied to the random mat to cause a lack of in-plane isotropy or an operation failure in the heating/pressurizing step. On the contrary, if the decrease in percentage of the void ratio is too small, the temperature rise efficiency of the random mat is extremely reduced, leading to a waste of energy or an increase in the length and size of the apparatus. At the second and subsequent stages, the void ratio is sequentially decreased to become from 40 vol % or more and less than 80 vol %, 30 vol % or more and less than 75 vol %, and the like, and whereby a composite base material suitable for obtaining a composite material excellent in the in-plane isotropy is obtained.

In the heating/pressurizing step, the decrease in the void ratio by one heating/pressurizing treatment is preferably less than 40 vol %, because a composite material excellent in the in-plane isotropy is readily obtained. The decrease in the void ratio is more preferably 32 vol % or less, still more preferably 23 vol % or less, yet still more preferably 20 vol % or less.

In the foregoing pages, the heating/pressurizing step in the method for producing the composite base material of the present invention is described, but a composite base material having a void ratio of 90 vol % or more of the present invention can also be easily obtained only by heating without pressurization. For example, the random mat in which a thermoplastic resin powder or fiber is adhered to or entangled with the mat-form material in which carbon fibers are entangled with each other, has a high void ratio and in many cases, has a void ratio of 90 vol % or more. Therefore, when such a random mat is only heated without being pressurized, a composite base material having a void ratio of 90 vol % or more of the present invention is obtained.

After the heating/pressurizing step, the composite base material of the present invention may be directly used for the production of a composite material or may be cut into an appropriate dimension/shape before use.

More Preferred Embodiment of Composite Base Material of the Present Invention

The composite base material of the present invention, which is a composite base material is obtained by heating and pressurizing a mat-form material in which a carbon fiber mat and a thermoplastic resin are combined, is preferably a composite base material obtained by applying heat and pressure so that the decrease in the void ratio to does not exceed 40 vol % in one heating and pressurizing treatment, because a composite material with reduced fiber orientation and excellent in-plane isotropy can be obtained by using the composite base material. In the present invention, a composite base material obtained by applying heat and pressure so that the decrease in the void ratio to become 32 vol % or less in one heating and pressurizing treatment is more preferred; a composite base material obtained by applying heat and pressure so that the decrease in the void ratio to become 23 vol % or less is still more preferred; and a composite base material obtained by applying heat and pressure so that the decrease in the void ratio to become 20 vol % or less is yet still more preferred.

The composite base material of the present invention, which is obtained by heating and pressurizing a mat-form material in which a carbon fiber mat and a thermoplastic resin are combined, is preferably a composite base material having a void ratio of more than 7 vol % and less than 80 vol %, the composite base material obtained by preparing a composite base material having a void ratio of 60 vol % or more and further heating and pressurizing the composite base material so that the decrease in the void ratio does not exceed 20 vol % in one heating and pressurizing treatment, because a composite material with more reduced fiber orientation and more excellent in-plane isotropy can be obtained by using the composite base material.

The composite base material of the present invention, which is a composite base material obtained by heating and pressurizing a mat-form material in which a carbon fiber mat and a thermoplastic resin are combined, is preferably a composite base material having a void ratio of more than 7 vol % and less than 80 vol %, preferably more than 7 vol % and less than 50 vol %, the composite material obtained by preparing a composite base material having a void ratio of 40 vol % or more and less than 60 vol % and further heating and pressurizing the composite base material so that the decrease in the void ratio does not exceed 30 vol % in one heating and pressurizing treatment, because a composite material with more reduced fiber orientation and more excellent in-plane isotropy can be obtained by using the composite base material.

In the composite base material of the present invention, the carbon fiber contained therein is preferably a carbon fiber having a width of 5 mm or less and a thickness of ½ or less of the width, because a composite material with more reduced fiber orientation, more excellent in-plane isotropy and higher development ratio of physical properties of the carbon fiber can be obtained by using the composite base material. In the present invention, the width of the carbon fiber is a longer one out of dimensions in two orthogonal directions in a cross-section perpendicular to the longitudinal direction of the carbon fiber, and the thickness of the carbon fiber is a shorter one out of those dimensions. In the case where the dimensions in two orthogonal directions in a cross-section perpendicular to the longitudinal direction of the carbon fiber are equal, the dimension in one arbitrary direction is taken as the width of the carbon fiber, and the other is taken as the thickness of the carbon fiber. The composite base material of the present invention, which is a composite base material obtained by heating and pressurizing a mat-form material in which a carbon fiber mat and a thermoplastic resin are combined, is preferably a composite base material having a void ratio of from more than 7 vol % to less than 80 vol % obtained by providing three or more heating and pressurizing steps and in at least one stage, carrying out the pressurization while applying heat and pressure under extremely weak conditions causing no decrease in the void ratio of the composite base material, because a composite material with more reduced fiber orientation and more excellent in-plane isotropy can be obtained by using the composite base material. The pressurization under extremely weak conditions causing no decrease in the void ratio of the composite base material includes, for example, a method where at the time of heating and pressurizing the composite base material, the treatment is performed by setting the gap distance of a certain roller pair to be equal to the gap distance of a roller pair at the previous stage.

[Composite Material]

The thus-obtained composite base material of the present invention is further pressurized, and whereby a composite material used as a precursor to obtain a shaped product for various applications can obtained.

The composite material obtained from the composite base material of the present invention has a void ratio as defined in formula (3) of preferably from 0 vol % or more and 7 vol % or less, more preferably 0 vol % or more and 3 vol % or less, and is excellent in the in-plane isotropy. The in-plane isotropy of a composite material can be quantitatively evaluated by measuring a specimen of the composite material for the tensile modulus in two directions orthogonal to each other and determining the ratio therebetween. When the ratio ($E\sigma$, hereinafter sometimes referred to as a tensile modulus ratio) obtained by dividing a larger value out of tensile modulus values in two directions of the composite material by a smaller value does not exceed 2, the sample is evaluated as in-plane isotropic, and when the ratio does not exceed 1.3, the sample is evaluated as excellent in the in-plane isotropy.

As the method for obtaining a composite material from the composite base material of the present invention, the composite base material after the heating/pressurizing step in the above-described production method of a composite base material may be subsequently pressurized while keeping it at a temperature not less than the softening point of the matrix resin, to obtain a composite material. At this time, the method for keeping the composite base material at a temperature not less than the softening point of the matrix resin may be a method of promptly using the composite base material for the production of a composite material before the temperature decreases to a temperature less than the softening point of the matrix resin or may be of course a method of keeping warm or heating the composite base material at a temperature not less than the softening point.

The composite material obtained by pressurizing or heating/pressurizing the composite base material is preferably completed as a composite material by a method of finally solidifying the thermoplastic resin by providing a cooling step of keeping the composite material at a temperature less than the softening point of the matrix resin of the composite base material, or the composite material after the pressurizing or heating/pressurizing step may be subsequently pressurized while cooling it to a temperature less than the softening point of the matrix resin to form a composite material.

The composite material obtained from the composite base material of the present invention is not particularly limited in its shape, but representative examples thereof include, similarly to the composite base material, a plate-shaped material, among others, a substantially rectangular plate-shaped material, and the plate-shaped material may be a so-called long material.

[Shaped Product]

The composite material above is used as a precursor of a shaped product. The method for molding the composite material is not particularly limited, but the composite material is molded, for example, by vacuum molding, hydraulic molding, hot pressing or cold pressing, and whereby a shaped product having a shape necessary for the usage can be suitably obtained.

At the time of molding of the composite material, a shaped product differing in the thickness according to the purpose can be obtained by appropriately adding a plurality of layers or a thermoplastic resin entirely or partially to the composite material. The thermoplastic resin is not particularly limited and may be the same resin as the matrix in the composite base material or may be different therefrom. Furthermore, the form of the resin used may also be a molten resin or a fibrous, powdery or filmy resin. Specific examples of the thermoplastic resin added at the time of molding are the same as those described in the paragraph of the thermoplastic resin in the composite base material.

[Layered Body]

As the composite material of the present invention, a layered body obtained by further layering the composite material of the present invention or a unidirectional carbon fiber material on a part or the entirety of at least one surface of the composite material of the present invention is also preferred. The unidirectional material is constituted by a thermoplastic resin and a unidirectional material in which continuous carbon fibers are aligned in one direction. The unidirectional material may be a stacked body obtained by stacking a plurality of unidirectional materials or may be a multiaxial woven fabric in which a stacked body (multiaxial woven fabric base material) obtained by stacking, at different angles, sheets formed from fiber-reinforced material bundles aligned in one direction is stitched with a stitching yarn, such as nylon yarn, polyester yarn and glass fiber yarn, penetrating in the thickness direction and reciprocating along the surface direction between the front side and the back side of the stacked body.

The average fiber diameter of the carbon fiber constituting the unidirectional material layer is preferably from 3 to 12 μm, more preferably from 5 to 7 μm.

The content of the thermoplastic resin in the unidirectional material is preferably from 3 to 400 parts by mass per 100 parts by mass of the carbon fiber. The content of the thermoplastic resin is more preferably from 10 to 100 parts by mass per 100 parts by mass of the carbon fiber.

The thermoplastic resin constituting the unidirectional material may be the same as or different from the matrix in the composite material. Specific examples of the thermoplastic resin are the same as those described in the paragraph of the thermoplastic resin in the composite base material.

The layering method is not particularly limited but includes, for example, a method by heat welding or pressure bonding.

In the case of heat welding, it is also preferred that a base material and a unidirectional material are combined and heated in the step of heating the random mat. The adhesion portion between the unidirectional material and the base material may a part of the surface or the entire surface. By combining the composite material of the present invention and a unidirectional material, the mechanical characteristics of a portion required in the shaped product can be intensively enhanced without involving an excessive increase in the weight.

EXAMPLES

Examples are illustrated below, but the present invention is not limited thereto, and many modifications can be made within the technical idea of the present invention by one having ordinary knowledge in this field. The densities of the carbon fibers or thermoplastic resins used in the following Examples and Comparative Examples are as follows.

PAN-Based carbon fiber "Tenax" (registered trademark) STS40-24KS: 1.75 g/cm³
Polybutylene terephthalate resin: 1.31 g/cm³
Polycarbonate: 1.20 g/cm³
Polyamide 6: 1.14 g/cm³

[Method for Determining Void Ratio]

1) The theoretical thickness ($t_1$) per unit area (1 m²) of the composite base material having a void ratio of 0% obtained from the random mat is calculated from the contents of carbon fiber and thermoplastic resin contained in the random mat.

2) The thickness in the entirety or given area of the random max is measured down to 1/100 mm at 100 points/m² by using a caliper without applying a load, and the average thickness of the random mat was determined from the obtained values. This average thickness is regarded as $t_2$, and the void ratio of the random mat is calculated according to formula (3) by using the determined average thickness together with the theoretical thickness ($t_1$) at a void ratio of 0% of the composite base material determined in the paragraph above. The obtained value is defined as the initial void ratio.

3) The average thickness of the composite vase material at the time of treatment of sequentially decreasing the void ratio in the heating/pressurizing step of the composite base material is designated as $t_2$, and the void ratio (Vr) of the composite base material is determined from the void content ($t_2-t_1$) according to the following formula (3):

$$Vr=(t_2-t_1)/t_2 \times 100 \qquad (3)$$

(wherein $t_1$ is the theoretical thickness calculated from the amount of carbon fiber and thermoplastic resin contained in the composite base material when the void ratio of the composite base material is 0 vol %, and $t_2$ is the average thickness of the composite base material.

Meanwhile, as for $t_2$ at each stage in the heating and pressurizing step, the gap distance of a roller pair applying pressure is taken as the average thickness ($t_2$) of the composite base material.

In Examples, the decrement value of the void ratio in a certain heating/pressurizing treatment is sometimes not consistent with the subtraction result of the void ratio between before and after the heating/pressurizing treatment. This is because the void ratio of the composite base material is expressed by a value rounded off to the nearest whole number. However, the employed decrement value of the void ratio in the heating/pressurizing treatment at each stage is a numerical value rounded off to the nearest whole number of the calculation result obtained by using the void ratio value not rounded off to the nearest whole number. As a result, an error is sometimes produced.

[Method for Determining Ratio of Carbon Fiber Bundle (A) to Total Amount of Fibers in Composite Base Material]

1) The composite base material is cut out into 100 mm×100 mm and treated in a furnace at 500° C.×for about 1 hour to remove the resin.

2) All fiber bundles are extracted with tweezers from the composite base material after removal of the resin.

3) The length ($L_i$) and weight ($W_i$) of individual fiber bundles are measured on all fiber bundles and recorded. Fiber bundles small to such an extent as cannot be extracted with tweezers are collectively measured for the weight ($W_k$) at the end. At this time, a balance capable of measuring down to 1/100 mg is used. The critical number of single fibers is calculated from the fiber diameter (D) of the carbon fiber used in the random mat, and the carbon fiber bundle (A) having carbon fibers of not less than the critical number of single fibers is separated from others. Incidentally, in the case where two or more kinds of carbon fibers are used, the fibers are divided by the kind, and the measurement and evaluation are performed on each kind of fiber.

4) After measuring on all sorts, the average number (N) of fibers in the carbon fiber bundle (A) is determined according to the following calculation. The number ($N_i$) of fibers in each carbon fiber bundle can be determined from the fineness (F) of the carbon fiber used according to formula (5):

$$N_i=W_i/(L_i \times F) \qquad (5)$$

The average number (N) of fibers in the carbon fiber bundle (A) is determined from the number (I) of bundles of the carbon fiber bundle (A) according to the following formula (6):

$$N=\Sigma N_i/I \qquad (6)$$

In addition, the ratio ($V_R$) of the carbon fiber bundle (A) to all fibers of the mat is determined using the fiber specific gravity (ρ) of the carbon fiber according to the following formula (7):

$$V_R=\Sigma(W_i/\rho)\times 100/((W_k+\Sigma W_i)/\rho) \qquad (7)$$

The width and thickness of the carbon fiber contained in the composite base material can also be measured as described above by removing the resin from the composite base material and extracting carbon fibers.

[Analysis of Fiber Orientation in Composite Material]

As the method for measuring the in-plane isotropy of the carbon fiber after molding the composite material, a tensile modulus is measured by performing a tensile test based on an arbitrary direction of a shaped plate and a direction orthogonal thereto, and a ratio (sometimes referred to as Eδ or a tensile modulus ratio) obtained by dividing the larger value by the smaller value out of the measured values of tensile modulus is measured, and whereby the in-plane isotropy can be confirmed. A tensile modulus ratio closer to 1 indicates that the material is more excellent in the in-plane isotropy.

Example 1

As the carbon fiber, PAN-based carbon fiber "Tenax" (registered trademark) STS40-24KS (average fiber diameter: 7 μm, strand width: 10 mm) produced by TOHO TENAX Co., Ltd was used. This carbon fiber strand was widened to a width of 15 to 20 mm, furthermore slit to a width of 0.8 mm by using a longitudinal slitter and then cut to a fiber length of 20 mm. As the cutting device, a rotary cutter having a cemented carbide-made spiral knife provided on the surface thereof was used.

A strand passed through the rotary cutter was introduced into a flexible transport pipe arranged just under the rotary cutter and subsequently introduced into a spraying device (air blowing nozzle). As the spraying device, a double tube was produced by welding SUS 304-made nipples different in the diameter and used. Small holes were provided in the inner tube of the double tube, and compressed air was fed between the inner tube and the outer tube by using a compressor. At this time, the wind velocity of air from the small hole was 50 m/sec. A tapered tube with the diameter increasing downward was welded to a lower part of the double tube.

A matrix resin was fed from the side surface of the tapered tube. As the matrix resin, a particle of nylon 6 resin "A1030" produced by Unitika Ltd. was used.

A breathable support (hereinafter, referred to as a fixing net) movable in a given direction was disposed under the tapered tube outlet and suctioned from below by a blower, and a mixture of the cut carbon fiber and the nylon resin was deposited in a band form on the fixing net while reciprocating the flexible transport pipe and the tapered tube in the width direction of the fixing net moving at a constant speed.

Thereafter, the feed rate of carbon fiber and the feed rate of matrix resin were set to 212 g/min and 320 g/min, respectively, and the apparatus was operated, as a result, a random mat resulting from mixing of the carbon fiber and the matrix fiber (thermoplastic resin) on the fixing net with no unevenness was continuously formed on the fixing net moving in a given direction. The carbon fiber a real weight of the random mat was 265 g/m$^2$.

The obtained random mat was examined for the ratio of the carbon fiber bundle (A) and the average number (N) of fibers. Then, the critical number of single fibers defined by formula (1) was 86, the ratio of the carbon fiber bundle (A) to the total amount of fibers in the mat was 80 vol %, and the average number (N) of fibers in the carbon fiber bundle (A) was 600. In addition, the nylon 6 particles were uniformly dispersed and firmly fixed in the carbon fiber with almost no unevenness. The initial void ratio was 91 vol %.

The random mat obtained above was subjected to a heating/pressurizing treatment by using an apparatus constituted by a steel belt, a roller and a heating furnace. This apparatus has a structure where a plurality of upper and lower roller pairs each spaced by a gap are disposed in the heating furnace and the steel belt is continuously passed therethrough in the manner of holding the random mat in the roller gap. The pressure acting on the random mat through the steel belt is adjusted by adjusting the gap between rollers disposed in the heating furnace to allow the composite base material to have the objective void ratio.

As described below, the steel belt clamping 6 random mats was passed through a plurality of roller gaps set to give a surface temperature of 260 to 360° C., so that the final composite material can have a thickness of 3 mm. The heating/pressurizing treatment for obtaining a composite base material was performed in 7 stages by using 7 roller pairs disposed in the steel belt running direction in the heating furnace and by gradually decreasing the void ratio in a stepwise manner of 85 vol %, 80 vol %, 75 vol %, 70 vol %, 58 vol %, 47 vol % and 29 vol % relative to the initial void ratio of 91 vol % of the random mat, a composite base material in which a thermoplastic resin was firmly fixed to a carbon fiber was obtained without causing a process failure. In one heating/pressurizing treatment, the void ratio was most decreased at the seventh stage and decreased there by 18 vol %. When the composite base material having a void ratio of 60 vol % or more was further heated/pressurized, the void ratio was most decreased at the fifth stage in one heating/pressurizing treatment and decreased there by 12 vol %. When the composite base material having a void ratio of 40 vol % or more and less than 60 vol % was further heated/pressurized, the void ratio was most decreased at the seventh stage in one heating/pressurizing treatment and decreased there by 18 vol %.

The high-temperature composite base material obtained above was subjected to a cooling/pressurizing step using a pair of cooling rollers at a temperature not more than the softening point of the thermoplastic resin. Then, a composite material plate having a thickness of 3 mm was obtained. A test piece was cut out from the obtained composite material plate and measured in accordance with JIS7164, as a result, the tensile modulus ratio between an arbitrary direction and a direction orthogonal thereto was 1.07.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 2

Using the random mat described in Example 1, as described below, a steel belt clamping 6 random mats was passed through gaps of a plurality of roller pairs set to give a surface temperature of 260 to 360° C., so that the final composite material can have a thickness of 3 mm. The heating/pressurizing treatment for obtaining a composite base material was performed in 6 stages by using 6 roller pairs disposed in the steel belt running direction in the heating furnace and by gradually decreasing the void ratio in a stepwise manner of 83 vol %, 78 vol %, 67 vol %, 50 vol %, 33 vol % and 19 vol % relative to the initial void ratio of 91 vol % of the random mat, a composite base material in which a thermoplastic resin was firmly fixed to a carbon fiber was obtained without causing a process failure. In one heating/pressurizing treatment, the void ratio was most decreased at the fourth and fifth stages, and in both of these stages, the void ratio was decreased by 17 vol %. When the composite base material having a void ratio of 60 vol % or more was further heated/pressurized, the void ratio was most decreased at the fourth stage in one heating/pressurizing treatment, where the void ratio was decreased by 17 vol %. When the composite base material having a void ratio of 40 vol % or more and less than 60 vol % was further heated/pressurized, the void ratio was most decreased at the fifth stage in one heating/pressurizing treatment, where the void ratio was decreased by 17 vol %.

The high-temperature composite base material obtained above was subjected to a cooling/pressurizing step using a pair of cooling rollers at a temperature not more than the softening point of the thermoplastic resin. Then, a composite material plate having a thickness of 3 mm was obtained. A test piece was cut out from the obtained composite material plate and measured in accordance with JIS7164, as a result, the tensile modulus ratio between an arbitrary direction and a direction orthogonal thereto was 1.12.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 3

Using the random mat described in Example 1, as described below, a steel belt clamping 6 random mats was passed through gaps of a plurality of roller pairs set to give a surface temperature of 260 to 360° C., so that the final composite material can have a thickness of 3 mm. The heating/pressurizing treatment for obtaining a composite base material was performed in 5 stages by using 5 roller pairs disposed in the steel belt running direction in the heating furnace and by gradually decreasing the void ratio in a stepwise manner of 80 vol %, 78 vol %, 60 vol %, 41 vol % and 23 vol % relative to the initial void ratio of 91 vol % of the random mat, a composite base material in which a thermoplastic resin was firmly fixed to a carbon fiber was obtained without causing a process failure. In one heating/pressurizing treatment, the void ratio was most decreased at the fourth stage, and in this stage, the void ratio was decreased by 19 vol %. When the composite base material having a void ratio of 60 vol % or more was further heated/pressurized, the void ratio was most decreased at the fourth stage in one heating/pressurizing treatment, where the void ratio was decreased by 19 vol %. When the composite base material having a void ratio of 40 vol % or more and less than 60 vol % was further heated/pressurized, the void ratio was most decreased at the fifth stage in one heating/pressurizing treatment, where the void ratio was decreased by 18 vol %.

The high-temperature composite base material obtained above was subjected to a cooling/pressurizing step using a pair of cooling rollers at a temperature not more than the softening point of the thermoplastic resin. Then, a composite material plate having a thickness of 3 mm was obtained. A test piece was cut out from the obtained composite material plate and measured in accordance with JIS7164, as a result, the tensile modulus ratio between an arbitrary direction and a direction orthogonal thereto was 1.09.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Comparative Example 1

Using the random mat described in Example 1, as described below, a steel belt clamping 6 random mats was passed through gaps of a plurality of roller pairs set to give a surface temperature of 260 to 360° C., so that the final composite material can have a thickness of 3 mm. The heating/pressurizing treatment for obtaining a composite base material was performed in 6 stages by using 6 roller pairs disposed in the steel belt running direction in the heating furnace and by gradually decreasing the void ratio in a stepwise manner of 80 vol %, 78 vol %, 60 vol %, 50 vol %, 33 vol % and 7 vol % relative to the initial void ratio of 91 vol % of the random mat, a composite base material was obtained without causing a process failure. In one heating/pressurizing treatment, the void ratio was most decreased at the sixth stage and decreased there by 26 vol %. When the composite base material having a void ratio of 60 vol % or more was further heated/pressurized, the void ratio was most decreased at the third stage in one heating/pressurizing treatment, where the void ratio was decreased by 18 vol %. When the composite base material having a void ratio of 40 vol % or more and less than 60 vol % was further heated/pressurized, the void ratio was most decreased at the fifth stage in one heating/pressurizing treatment, where the void ratio was decreased by 17 vol %.

The high-temperature composite base material obtained above was subjected to a cooling/pressurizing step using a pair of cooling rollers at a temperature not more than the softening point of the thermoplastic resin. Then, a composite material plate having a thickness of 3 mm was obtained. The obtained composite material plate was measured in accordance with JS7164, as a result, the tensile modulus ratio between an arbitrary direction and a direction orthogonal thereto was 1.43. By observing the surface of the composite material with an eye, it was confirmed that carbon fibers are aligned along the steel belt running direction in the production process of the composite base material.

Reference Example 1

Using the random mat described in Example 1, as described below, a steel belt clamping 6 random mats was passed through gaps of a plurality of roller pairs set to give a surface temperature of 260 to 360° C., so that the final composite material can have a thickness of 3 mm. A heating/pressurizing treatment for obtaining a composite base material was performed using 1 roller pair disposed in the steel belt running direction in the heating furnace with an attempt to obtain a composite base material having a void ratio of 67 vol % from the random mat having an initial void ratio of 91 vol %, but a process failure occurred, that is, the random mat clamped by the steel belt did not proceed downstream of the roller gap, and a composite base material was not able to be obtained.

Reference Example 2

Using the random mat described in Example 1, a steel belt clamping 6 random mats was passed through gaps of a plurality of roller pairs set to give a surface temperature of 260 to 360° C., so that the final composite material can have a thickness of 3 mm. A heating/pressurizing treatment for obtaining a composite base material was performed using 2 roller pairs disposed in the steel belt running direction in the heating furnace with an attempt to decrease the void ratio in a stepwise manner of 83 vol % and 50 vol % relative to the random mat having an initial void ratio of 91 vol %, but the same process failure as in Reference Example 1 occurred in the heating/pressurization at the second stage, and a composite base material usable for obtaining a composite material was not able to be obtained.

Example 4

A random mat having a carbon fiber a real weight of 294 g/m$^2$ and an initial void ratio of 88 vol % was obtained by performing the operation in the same manner as in the production of a random mat in Example 1 except for changing the feed rate of carbon fiber to 236 g/min and changing the feed rate of nylon 6 resin "A1030" as the matrix resin to 275 g/min. The ratio of the carbon fiber bundle (A) and the average number (N) of fibers in the random mat obtained were the same as those in Example 1. In the obtained random mat, the nylon 6 particles were uniformly dispersed and fixed in the carbon fiber with almost no unevenness.

Using the random mat obtained above, as described below, a steel belt clamping 8 random mats was passed through gaps of a plurality of roller pairs set to give a surface temperature of 260 to 360° C., so that the final composite material can have a thickness of 3.7 mm. The heating/pressurizing treatment for obtaining a composite base material was performed in 5 stages by using 3 pairs out of 5 roller pairs disposed in the steel belt running direction in the heating furnace, where in two stages out of those stages, the treatment was performed under an extremely weak pressurizing condition involving no decrease in the void ratio, and by gradually decreasing the void ratio in a stepwise manner of 59 vol %, 59 vol %, 38 vol %, 38 vol % and 8 vol % relative to the initial void ratio of 88 vol % of the random mat, a composite base material in which a thermoplastic resin was firmly fixed to a carbon fiber was obtained without causing a process failure. In one heating/pressurizing treatment, the void ratio was most decreased at the fifth stage where the void ratio was decreased by 31 vol %. When the composite base material having a void ratio of 60 vol % or more was further heated/pressurized, the void ratio was not decreased. When the composite base material having a void ratio of 40 vol % or more and less than 60 vol % was further heated/pressurized, the void ratio was most decreased at the third stage in one heating/pressurizing treatment, where the void ratio was decreased by 21 vol %.

The high-temperature composite base material obtained above was subjected to a cooling/pressurizing step using a pair of cooling rollers at a temperature not more than the softening point of the thermoplastic resin. Then, a composite material plate having a thickness of 3.7 mm was obtained. A test piece was cut out from the obtained composite material plate and measured in accordance with JIS7164, as a result, the tensile modulus ratio between an arbitrary direction and a direction orthogonal thereto was 1.18.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 5

Using the random mat described in Example 4, as described below, a steel belt clamping 6 random mats was passed through gaps of a plurality of roller pairs set to give a surface temperature of 260 to 360° C., so that the final composite material can have a thickness of 2.8 mm. The heating/pressurizing treatment for obtaining a composite base material was performed in 6 stages by using 6 roller pairs disposed in the steel belt running direction in the heating furnace, where in two stages out of those stages, the treatment was performed under an extremely weak pressurizing condition involving no decrease in the void ratio, and by gradually decreasing the void ratio in a stepwise manner of 69 vol %, 69 vol %, 53 vol %, 53 vol %, 30 vol % and 20 vol % relative to the initial void ratio of 88 vol % of the random mat, a composite base material in which a thermoplastic resin was firmly fixed to a carbon fiber was obtained without causing a process failure. In one heating/pressurizing treatment, the void ratio was most decreased at the fifth stage and decreased there by 23 vol %. When the composite base material having a void ratio of 60 vol % or more was further heated/pressurized, the void ratio was most decreased at the third stage in one heating/pressurizing treatment, where the void ratio was decreased by 16 vol %. When the composite base material having a void ratio of 40 vol % or more and less than 60 vol % was further heated/pressurized, the void ratio was most decreased at the fifth stage in one heating/pressurizing treatment, where the void ratio was decreased by 23 vol %.

The high-temperature composite base material obtained above was subjected to a cooling/pressurizing step using a pair of cooling rollers at a temperature not more than the softening point of the thermoplastic resin. Then, a composite material plate having a thickness of 2.8 mm was obtained. A test piece was cut out from the obtained composite material plate and measured in accordance with JIS7164, as a result, the tensile modulus ratio between an arbitrary direction and a direction orthogonal thereto was 1.09.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 6

Using the random mat described in Example 4, as described below, a steel belt clamping 5 random mats was passed through gaps of a plurality of roller pairs set to give a surface temperature of 260 to 360° C., so that the final composite material can have a thickness of 2.3 mm. The heating/pressurizing treatment for obtaining a composite base material was performed in 6 stages by using 6 roller pairs disposed in the steel belt running direction in the heating furnace, where in two stages out of those stages, the treatment was performed under an extremely weak pressurizing condition involving no decrease in the void ratio, and by gradually decreasing the void ratio in a stepwise manner of 74 vol %, 74 vol %, 62 vol %, 62 vol %, 43 vol % and 16 vol % relative to the initial void ratio of 88 vol % of the random mat, a composite base material in which a thermoplastic resin was firmly fixed to a carbon fiber was obtained without causing a process failure. In one heating/pressurizing treatment, the void ratio was most decreased at the sixth stage and decreased there by 26 vol %. When the composite base material having a void ratio of 60 vol % or more was further heated/pressurized, the void ratio was most decreased at the third stage in one heating/pressurizing treatment, where the void ratio was decreased by 16 vol %. When the composite base material having a void ratio of 40 vol % or more and less than 60 vol % was further heated/pressurized, the void ratio was most decreased at the sixth stage in one heating/pressurizing treatment, where the void ratio was decreased by 26 vol %.

The high-temperature composite base material obtained above was subjected to a cooling/pressurizing step using a pair of cooling rollers at a temperature not more than the softening point of the thermoplastic resin. Then, a composite material plate having a thickness of 2.3 mm was obtained. A test piece was cut out from the obtained composite material plate and measured in accordance with JIS7164, as a result, the tensile modulus ratio between an arbitrary direction and a direction orthogonal thereto was 1.13.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 7

Using the random mat described in Example 4, as described below, a steel belt clamping 4 random mats was passed through gaps of roller pairs set to give a surface temperature of 260 to 360° C., so that the final composite material can have a thickness of 1.9 mm. The heating/pressurizing treatment for obtaining a composite base material was performed in 6 stages by using 6 roller pairs disposed in the steel belt running direction in the heating furnace, where in two stages out of those stages, the treatment was performed under an extremely weak pressurizing condition involving no decrease in the void ratio, and by gradually decreasing the void ratio in a stepwise manner of 79 vol %, 79 vol %, 68 vol %, 68 vol %, 53 vol % and 21 vol % relative to the initial void ratio of 88 vol % of the random mat, a composite base material in which a thermoplastic resin was firmly fixed to a carbon fiber was obtained without causing a process failure. In one heating/pressurizing treatment, the void ratio was most decreased at the sixth stage and decreased there by 32 vol %. When the composite base material having a void ratio of 60 vol % or more was further heated/pressurized, the void ratio was most decreased at the fifth stage in one heating/pressurizing treatment, where the void ratio was decreased by 16 vol %. When the composite base material having a void ratio of 40 vol % or more and less than 60 vol % was further heated/pressurized, the void ratio was most decreased at the sixth stage in one heating/pressurizing treatment, where the void ratio was decreased by 32 vol %.

The high-temperature composite base material obtained above was subjected to a cooling/pressurizing step using a pair of cooling rollers at a temperature not more than the softening point of the thermoplastic resin. Then, a composite material plate having a thickness of 1.9 mm was obtained. A test piece was cut out from the obtained composite material plate and measured in accordance with JIS7164, as a result, the tensile modulus ratio between an arbitrary direction and a direction orthogonal thereto was 1.07.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 8

A random mat having a carbon fiber a real weight of 945 g/m² and an initial void ratio of 93 vol % was obtained by performing the operation in the same manner as in the production of a random mat in Example 1 except for changing the feed rate of carbon fiber to 945 g/min and changing the feed rate of nylon 6 resin "A1030" as the matrix resin to 1,102 g/min. The ratio of the carbon fiber bundle (A) and the average number (N) of fibers in the random mat obtained were the same as those in Example 1. In the obtained random mat, the nylon 6 particles were uniformly dispersed and fixed in the carbon fiber with almost no unevenness.

Using the random mat obtained above, as described below, a steel belt clamping 1 random mat was passed through gaps of roller pairs set to give a surface temperature of 260 to 360° C., so that the final composite material can have a thickness of 1.5 mm. The heating/pressurizing treatment for obtaining a composite base material was performed in 6 stages by using 6 roller pairs disposed in the steel belt running direction in the heating furnace, where in two stages out of those stages, the treatment was performed under an extremely weak pressurizing condition involving no decrease in the void ratio, and by gradually decreasing the void ratio in a stepwise manner of 75 vol %, 75 vol %, 63 vol %, 63 vol %, 50 vol % and 25 vol % relative to the initial void ratio of 93 vol % of the random mat, a composite base material in which a thermoplastic resin was firmly fixed to a carbon fiber was obtained without causing a process failure. In one heating/pressurizing treatment, the void ratio was most decreased at the sixth stage and decreased there by 25 vol %. When the composite base material having a void ratio of 60 vol % or more was further heated/pressurized, the void ratio was most decreased at the fifth stage in one heating/pressurizing treatment, where the void ratio was decreased by 13 vol %. When the composite base material having a void ratio of 40 vol % or more and less than 60 vol % was further heated/pressurized, the void ratio was most decreased at the fifth stage in one heating/pressurizing treatment, where the void ratio was decreased by 25 vol %.

The high-temperature composite base material obtained above was subjected to a cooling/pressurizing step using a pair of cooling rollers at a temperature not more than the softening point of the thermoplastic resin. Then, a composite material plate having a thickness of 1.5 mm was obtained. A test piece was cut out from the obtained composite material plate and measured in accordance with JIS7164, as a result, the tensile modulus ratio between an arbitrary direction and a direction orthogonal thereto was 1.04.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 9

A random mat having a carbon fiber a real weight of 1,260 g/m² and an initial void ratio of 91 vol % was obtained by performing the operation in the same manner as in the production of a random mat in Example 1 except for changing the feed rate of carbon fiber to 1,260 g/min and using, as the matrix resin, a polycarbonate (Panlite (registered trademark) L-1225Y, produced by Teijin Chemicals Ltd.) at a feed rate of 1,560 g/min in place of nylon 6 resin "A1030". The ratio of the carbon fiber bundle (A) and the average number (N) of fibers in the random mat obtained were the same as those in Example 1. In the obtained random mat, the polycarbonate particles were uniformly dispersed and fixed in the carbon fiber with almost no unevenness.

Using the random mat obtained above, as described below, a steel belt clamping 1 random mat was passed through gaps of roller pairs set to give a surface temperature of 260 to 360° C., so that the final composite material can have a thickness of 2.0 mm. The heating/pressurizing treatment for obtaining a composite base material was performed in 6 stages by using 6 roller pairs disposed in the steel belt running direction in the heating furnace, and by gradually decreasing the void ratio in a stepwise manner of 80 vol %, 67 vol %, 50 vol %, 33 vol %, 20 vol % and 9 vol % relative to the initial void ratio of 91 vol % of the random mat, a composite base material in which a thermoplastic resin was firmly fixed to a carbon fiber was obtained without causing a process failure. In one heating/pressurizing treatment, the void ratio was most decreased at the third and fourth stages, and in both of these stages, the void ratio was decreased by 17 vol %. When the composite base material having a void ratio of 60 vol % or more was further heated/pressurized, the void ratio was most decreased at the third stage in one heating/pressurizing treatment, where the void ratio was decreased by 17 vol %. When the composite base material having a void ratio of 40 vol % or more and less than 60 vol % was further heated/pressurized, the void ratio was most decreased at the fourth stage in one heating/pressurizing treatment, where the void ratio was decreased by 17 vol %.

The high-temperature composite base material obtained above was subjected to a cooling/pressurizing step using a pair of cooling rollers at a temperature not more than the softening point of the thermoplastic resin. Then, a composite material plate having a thickness of 2.0 mm was obtained. A test piece was cut out from the obtained composite material plate and measured in accordance with JIS7164, as a result, the tensile modulus ratio between an arbitrary direction and a direction orthogonal thereto was 1.08.

Meanwhile, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

Example 10

A random mat having a carbon fiber a real weight of 1,260 g/m² and an initial void ratio of 91 vol % was obtained by performing the operation in the same manner as in the production of a random mat in Example 1 except for changing the feed rate of carbon fiber to 1,260 g/min and using, as the matrix resin, a polybutylene terephthalate resin (Duranex (registered trademark) 2002, produced by WinTech Polymer Ltd., hereinafter sometimes simply referred to as PBT) at a feed rate of 1,703 g/min in place of nylon 6 resin "A1030". The ratio of the carbon fiber bundle (A) and the average number (N) of fibers in the random mat obtained were the same as those in Example 1. In the obtained random mat, the PBT particles were uniformly dispersed and fixed in the carbon fiber with almost no unevenness.

Using the random mat obtained above, as described below, a steel belt clamping 1 random mat was passed through gaps of roller pairs set to give a surface temperature of 260 to 400° C., so that the final composite material can have a thickness of 2.0 mm. The heating/pressurizing treatment for obtaining a composite base material was performed in 5 stages by using 5 roller pairs disposed in the steel belt running direction in the heating furnace, and by gradually decreasing the void ratio in a stepwise manner of 72 vol %, 60 vol %, 43 vol %, 20 vol % and 10 vol % relative to the initial void ratio of 91 vol % of the random mat, a composite base material in which a thermoplastic resin was firmly fixed to a carbon fiber was obtained without causing a process failure. In one heating/pressurizing treatment, the void ratio was most decreased at the fourth stage where the void ratio was decreased by 23 vol %. When the composite base material having a void ratio of 60 vol % or more was further heated/pressurized, the void ratio was most decreased at the third stage in one heating/pressurizing treatment, where the void ratio was decreased by 17 vol %. When the composite base material having a void ratio of 40 vol % or more and less than 60 vol % was further heated/pressurized, the void ratio was most decreased at the fourth stage in one heating/pressurizing treatment, where the void ratio was decreased by 23 vol %.

The high-temperature composite base material obtained above was subjected to a cooling/pressurizing step using a pair of cooling rollers at a temperature not more than the softening point of the thermoplastic resin. Then, a composite material plate having a thickness of 2.0 mm was obtained. A test piece was cut out from the obtained composite material plate and measured in accordance with JIS7164, as a result, the tensile modulus ratio between an arbitrary direction and a direction orthogonal thereto was 1.05.

Incidentally, the average fiber length of carbon fibers in the obtained composite base material or composite material was 20 mm that is the length when the carbon fiber strand was cut. Similarly, the width of the carbon fiber in the obtained composite base material or composite material was significantly narrower than 5 mm, and the thickness of the carbon fiber was ½ or less of the width.

INDUSTRIAL APPLICABILITY

The composite base material of the present invention is suitable for the production of a carbon fiber-reinforced composite material useful for various applications such as automotive structural member.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2012-151470) filed on Jul. 5, 2012, the contents of which are incorporated herein by way of reference.

TABLE 1

| | Void Ratio of Composite Base Material (vol %) | | | | | | | Tensile Modulus Ratio |
| --- | --- | --- | --- | --- | --- | --- | --- | --- |
| | First Stage | Second Stage | Third Stage | Fourth Stage | Fifth Stage | Sixth Stage | Seventh Stage | Occurrence of Process Failure | of Composite Material (Eσ) |
| Example 1 | 85 | 80 | 75 | 70 | 58 | 47 | 29 | none | 1.07 |
| Example 2 | 83 | 78 | 67 | 50 | 33 | 19 | — | none | 1.12 |
| Example 3 | 80 | 78 | 60 | 41 | 23 | — | — | none | 1.09 |
| Comparative Example 1 | 80 | 78 | 60 | 50 | 33 | 7 | — | none | 1.43 |
| Reference Example 1 | goal: 67 (unachieved) | — | — | — | — | — | — | occurred | — |
| Reference Example 2 | 83 | goal: 50 (unachieved) | — | — | — | — | — | occurred | — |
| Example 4 | 59 | 59 | 38 | 38 | 8 | — | — | none | 1.18 |
| Example 5 | 69 | 69 | 53 | 53 | 30 | 20 | — | none | 1.09 |
| Example 6 | 74 | 74 | 62 | 62 | 43 | 16 | — | none | 1.13 |
| Example 7 | 79 | 79 | 68 | 68 | 53 | 21 | — | none | 1.07 |
| Example 8 | 75 | 75 | 63 | 63 | 50 | 25 | — | none | 1.04 |
| Example 9 | 80 | 67 | 50 | 33 | 20 | 9 | — | none | 1.08 |
| Example 10 | 72 | 60 | 43 | 20 | 10 | — | — | none | 1.05 |

DESCRIPTION OF REFERENCE NUMERALS AND SIGNS

1: Carbon fiber
2: Pinch roller
3: Rubber roller
4: Rotary cutter main body
5: Blade
6: Cut carbon fiber
7: Pitch of blades
8: Blade parallel to fiber direction
9: Heating/pressurizing roller
10: Composite base material

The invention claimed is:

1. A composite base material, comprising:
   carbon fibers having an average fiber length of 3 mm or more and 100 mm or less; and
   a thermoplastic resin is firmly fixed to the carbon fibers in an amount of 3 to 100 parts by mass with respect to 100 parts by mass of the carbon fibers, wherein a void ratio of the composite base material is more than 7 vol % to less than 100 vol %, wherein a width of the carbon fibers is 5 mm or less and a thickness of the carbon fibers is ½ or less of the width, and wherein the carbon fibers are in a mat-form material in which the carbon fibers are two-dimensionally randomly oriented and no carbon fibers are aligned in one direction on a surface thereof.

2. The composite base material according to claim 1, wherein the composite base material is obtained by heating and pressurizing a mat-form material in which a carbon fiber mat and a thermoplastic resin are combined, and the composite base material is obtained by applying heat and pressure so that a decrease in the void ratio does not exceed 40 vol % in one heating and pressurizing treatment.

3. The composite base material according to claim 1, wherein the composite base material is obtained by heating and pressurizing a mat-form material in which a carbon fiber mat and a thermoplastic resin are combined, and the composite base material has the void ratio of more than 7 vol % to less than 80 vol %, obtained by preparing a composite base material having a void ratio of 60 vol % or more and further heating and pressurizing the composite base material so that a decrease in the void ratio does not exceed 20 vol % in one heating and pressurizing treatment.

4. The composite base material according to claim 1, wherein the composite base material is obtained by heating and pressurizing a mat-form material in which a carbon fiber mat and a thermoplastic resin are combined, and the composite base material is a composite base material having a void ratio of from more than 7 vol % to less than 80 vol %, obtained by preparing a composite base material having a void ratio of from 40 vol % to less than 60 vol % and further heating and pressurizing the composite base material so that a decrease in the void ratio does not exceed 30 vol % in one heating and pressurizing treatment.

5. The composite base material according to claim 1, wherein a carbon fiber bundle (A) constituted by the carbon fibers of not less than a critical number of single fibers, defined by the following formula (1), is present in the carbon fibers:

$$\text{Critical number of single fibers} = 600/D \tag{1}$$

wherein D is an average fiber diameter (m) of single carbon fibers.

6. The composite base material according to claim 5, wherein a ratio of the carbon fiber bundle (A) to a total amount of the carbon fibers contained in the composite base material is more than 0 vol % to less than 99 vol %.

7. The composite base material according to claim 5, wherein an average number (N) of fibers in the carbon fiber bundle (A) satisfies the following formula (2):

$$0.7 \times 10^4/D^2 < N < 2 \times 10^5/D^2 \tag{2}$$

wherein D is the average fiber diameter (μm) of single carbon fibers.

8. The composite base material according to claim 1, wherein the void ratio is more than 7 vol % to less than 90 vol %.

9. The composite base material according to claim 1, wherein the void ratio is more than 7 vol % to less than 40 vol %.

10. The composite base material according to claim 1, which is a long plate-shaped material.

11. A composite material obtained by pressurizing the composite base material according to claim 1.

12. The composite material according to claim 11, wherein a void ratio of the composite material is from 0 to 7 vol %.

* * * * *